Oct. 7, 1952
C. W. HANSEN
2,612,763
SAFETY SHIELD
Filed Feb. 26, 1947
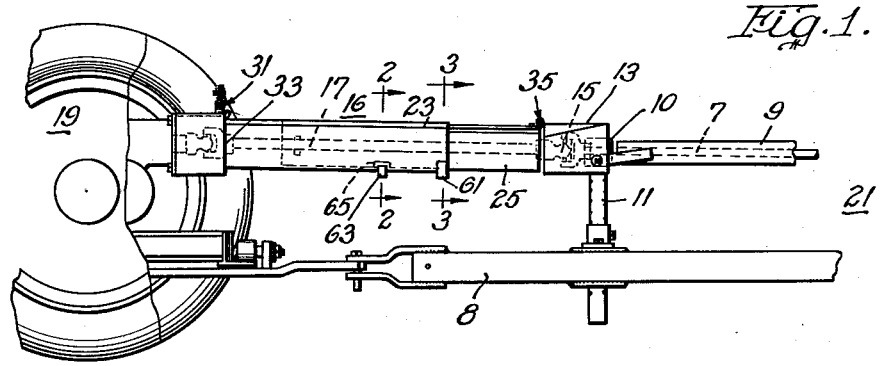
Fig. 1.
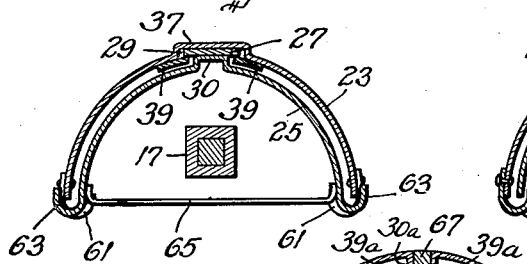
Fig. 2.
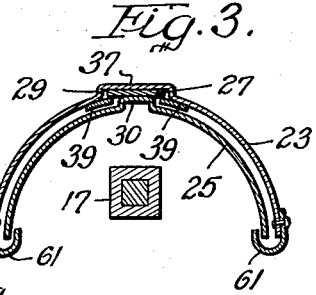
Fig. 3.
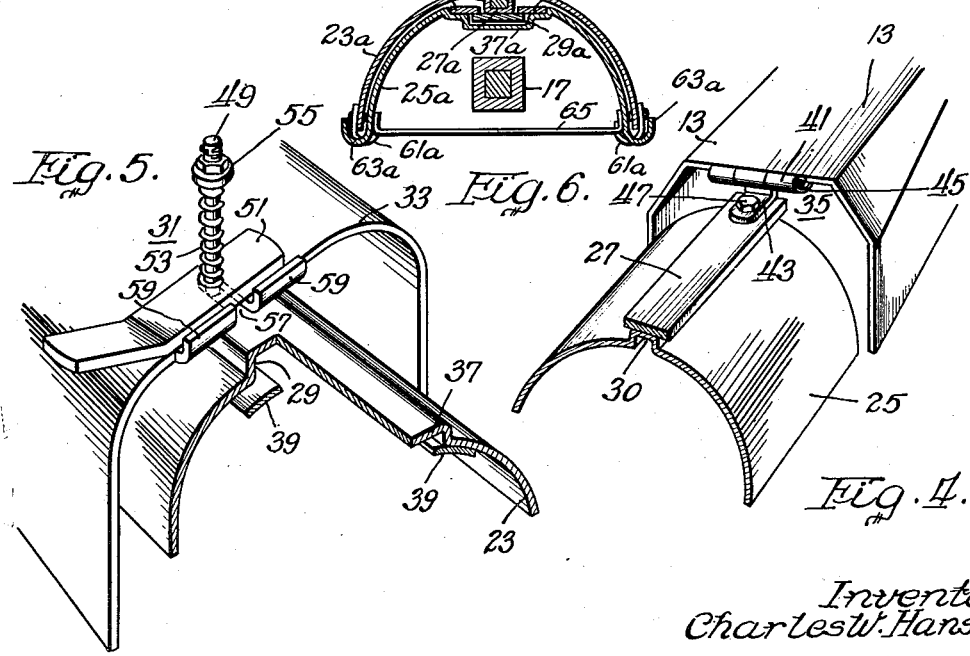
Fig. 5.
Fig. 6.
Fig. 4.
Inventor:
Charles W. Hansen
By Soans, Pond & Anderson
Attys.

Patented Oct. 7, 1952

2,612,763

UNITED STATES PATENT OFFICE 2,612,763

SAFETY SHIELD

Charles W. Hansen, Racine, Wis., assignor to J. I. Case Company, Racine, Wis., a corporation of Wisconsin Application February 26, 1947, Serial No. 731,072

7 Claims. (Cl. 64—3)

The present invention relates to safety shields and, in particular, to an improved telescoping safety shield which is adapted to guard the power take-off shaft that extends between a tractor, or other draft vehicle, and the implement or other device which is drawn by, and powered from, the tractor.

In the past few years, the use of farm implements such as corn pickers, combines, etc. which are adapted to be drawn by and powered from the power take-off of a tractor or other vehicle, has become increasingly common. As a result, the number of serious injuries which have occurred because of poorly guarded power take-off shafts has greatly increased. Power take-off safety shields are usually provided with the powered implement when it is purchased, but the operator of the equipment frequently fails to connect the shield between the tractor and the implement, thus subjecting himself and others to the hazards surrounding a rapidly rotating unguarded shaft; or the safety shield provided is made of such light construction that it does not withstand the hard usage to which it is put and is, subsequently, discarded.

A satisfactory shield for the power take-off on apparatus of the class described, must be strong enough to withstand large strains as may be occasioned by the operator standing upon, or falling against, the shield. At the same time, the shield must be of sufficiently light construction that it can be easily attached to the tractor, and can be economically manufactured.

The object of the present invention, therefore, is to provide an improved safety shield for the exposed section of the power take-off shaft which is normally unguarded by the permanent guard members provided on the vehicles. An articulated shield which guards the entire length of the shaft from the implement to the tractor is thus provided. The above and other objects and advantages of the invention are made possible by the provision of the novel structural arrangements disclosed in the following description and the accompanying drawings.

In the drawings:

Fig. 1 is a fragmentary, side elevational view of a power take-off shield, embodying the features of the present invention, installed between a tractor and a farm implement;

Fig. 2 is a sectional view taken on line 2—2 in Fig. 1;

Fig. 3 is a sectional view taken on line 3—3 in Fig. 1;

Fig. 4 is a fragmentary, perspective view of a hinge which may be used to permanently connect the safety shield to the implement;

Fig. 5 is a fragmentary, perspective view of locking means which may be used to connect the safety shield illustrated to the tractor power take-off guard member; and Fig. 6 is a section view similar to Fig. 2 showing a modified form of the safety shield.

As previously stated, farm implements of the class described are provided with a power take-off shaft, as illustrated at 7, which is vertically adjustable in relation to the draw bar 8 so as to allow the implement to be used with various sizes and makes of tractors. Usually, the power take-off shaft 7 on the implement is covered by a suitable, permanent guard 9 which extends rearward from the adjustable pedestal member 11 to the termination point of the shaft. The outer end of the shaft 7 is journalled in a suitable bearing 10 which is also supported on the pedestal 11. There is usually a flared, guard member 13 at the vertically adjustable support point adapted to protect the universal joint 15. This joint allows angular variations in position between the power take-off shaft 7 on the implement and an extension 17 which joins the fixed shaft 7 to the tractor. The flared guard member 13 is also adapted to receive a shield 16 that will protect the extension of the shaft 17 between the tractor and the implement, generally indicated by 19 and 21 respectively.

The safety shield 16 of the present invention includes a pair of sheet metal, shell members 23, and 25, usually having a semi-circular or otherwise curved cross-section which are adapted to nest within one another and to be longitudinally extensible by means of a suitable key 27 and guideway 29. Locking means 31 is provided at one end of the shield for removably locking the shield to the guard member 33 on the tractor power take-off; and hinge means 35 is provided at the other end to permanently attach the shield to the implement 21 for universal pivoting.

One of the shell members 23 has a raised, relatively wide rib section 37 at the top thereof. The channel defined by rib 37 is adapted to be formed into a T shaped guideway 29 by attaching two longitudinally extending, stiffening members 39 to the inner face of the shell member 23 so that they overhang the channel defined by rib 37. The inner shell member 25, which is nested within the outer member 23, is provided with a narrow, longitudinally extending rib 30 to which the longitudinally extending key 27 is riveted or welded. The relative dimensions of the parts are correlated so that the key 27 engages the guideway 29, and allows the inner member 25 to slide freely within the outer member 23. The provision of two stiffening members 39 and the rib 37 forming a guideway 29 in the outer shell member 23, and the sliding key 27 attached to the rib 30 on the inner shell member 25 effectively strengthens the structure without making it necessary to increase the weight of the whole shield unduly.

The present safety shield is adapted to be connected to the guard member on the implement by means of a permanent hinge 35 which allows vertical movement of the shield when traversing uneven ground, and transverse movement of the shield when turning. The hinge 35 includes a pair of hinge brackets 41 and 43, connected by a horizontally disposed pin 45 which allows free vertical movement. Articulated or transverse movement is accomplished by means of a swivel connection between the hinge bracket and a vertically extending bolt 47 attached to the shell member.

The other end of the shield is provided with positive locking means 31 for connecting the shield to the tractor guard member 33. The locking means 31 includes a vertically extending bolt 49 upon which is slidably mounted, a latch member 51 held in position by a compression spring 53 that is tensioned by a nut and washer assembly 55. The permanent tractor guard member 33 is provided with a slot 57 adapted to receive the bolt 49, and, at the rear edge of the guard member 33, an upwardly extending ear 59 is formed on each side of the slot 57.

In order to connect the shield to the tractor guard 33, the latch 51 is lifted against the spring pressure, and the bolt 49 is slid into the slot 57 provided in the tractor guard member 33. The latch 51 is turned to engage the ears 59, thus holding the shield in place by means of the spring pressure on the latch 51 and the engagement between the latch 51 and the ears 59.

To prevent the nested shell members 23 and 25 from being extended beyond a predetermined length, stop tabs 61 and 63 are provided on the shell members. The outer member 23 has its stop tabs 61 turned inward, while the tabs 63 on the inner member 25 turn outwardly to engage the tabs 61 on the outer member. It is apparent that if an attempt is made to extend the nested members beyond safe limits, the stop tabs 61 and 63, will engage each other and prevent such movement. The tabs also aid in preventing the flattening of the nested shell members in the outward direction when the shield is subjected to a vertical force, and thus tend to prevent the flattening of the entire structure.

A transverse guard member 65 is connected across the lower portion of the inner shell 25 substantially as shown in the drawings. The ends of the guard member 65 are conveniently attached to the shell member 25 at a point closely adjacent the stop tabs 63. The guard 65 prevents the operator from swinging the shield upward and makes it necessary for him to properly secure the shield between the vehicles before operating them. The guard member 65 also serves as a bracing member which prevents large shear loads from flattening or collapsing the nested shell members.

If an even stronger structure than that described is required, the construction may be varied to allow for an added reinforcing member 65 as shown in Fig. 6. In this construction the wide rib 37a is provided in the inner shell member 25a as shown in the drawings. The longitudinally extending strengthening members 39a are attached to the outer surface of the member 25a so that they overhang the channel formed by rib 37a and form a guideway 29a on the outer surface of the inner member 25a. The outer shell member 23a has a narrow rib 30a which extends longitudinally the shell 23a and which defines a channel in the outer surface. This channel may then receive an added reinforcing member 67. The longitudinally extending key 27a is attached to the rib 30a in a manner similar to that described previously and the key 27a slides freely in the guideway 29a provided.

The cooperating action of the ribs and the engaging key and the strengthening members which constitute the adjustable connection between the shield sections provide, in effect, a massive structural section of extreme strength and rigidity. As a result the improved shield of the present invention is much stronger and much more reliable than the previously known constructions. At the same time, it can be manufactured of relatively lightweight materials. The shield may be permanently attached to a farm implement so that the shield is always with the machine and arranged so that the operator must put the shield in place when attaching the implement to the draft vehicle. As an added safety feature, the shield is provided with a locking means for positively engaging it with the draft vehicle, and, at the same time, allowing relative movement between the draft vehicle and the implement.

The features of my invention that are believed to be new are expressly set forth in the appended claims.

I claim:

1. A safety shield for a power take-off shaft which extends between two coupled vehicles, comprising, in combination, a permanent safety guard on each of said vehicles and an intermediate safety shield adapted to connect said guards, said intermediate shield including a pair of nested, open-ended sections adapted to extend protectively around the top and sides of said power take-off shaft, said sections being slidably engaged so as to allow extension of said shield in a longitudinal direction, one of said sections having means adapted to disengageably connect said section with the safety guard on one of said vehicles, hinge means for connecting the other section to the safety guard on the other of said vehicles, and a member disposed below the power take-off shaft, said member being connected to one of said sections and extending transversely across said section to prevent upward swinging of said shield out of shielding association with said shaft in the event that said disengageable connecting means is disengaged from its associated permanent safety shield.

2. A safety shield for a power take-off shaft which extends between two coupled vehicles, comprising, in combination, a permanent safety guard on each of said vehicles and an intermediate safety shield adapted to connect said guards, said intermediate shield including a pair of nested, open-ended sections adapted to extend protectively around the top and sides of said power take-off shaft, one of said sections having a longitudinally extending guideway, the other of said sections having a key portion adapted to engage said guideway so as to allow extension of said shield in a longitudinal direction, one of said sections having means adapted to disengageably connect said section with the safety guard on one of said vehicles, hinge means for connecting the other section to the safety guard on the other of said vehicles, said hinge means including horizontal and vertical hinge pins so as to permit swivel movement of said intermediate safety shield in relation to the permanent safety guards, and a member disposed below the power take-off shaft, said member being connected to one of said sections and extending transversely across said section to prevent said shield from being swung out of association with said shaft in the event that said disengageable connecting means is disengaged from its associated permanent safety guard.

3. A safety shield for a power take-off shaft which extends between two coupled vehicles, comprising, in combination, a permanent safety guard on each of said vehicles and an intermediate safety shield adapted to connect said guards, said intermediate shield including a pair of nested, open-ended sections adapted to extend around said power take-off shaft, said sections being arranged to allow extension of said shield in a longitudinal direction and having means adapted to connect said sections with the permanent safety guards on the coupled vehicles, the connection to at least one of said safety guards being disengageable, and a stop tab attached to each of said nested sections, said stop tabs being proportioned to engage one another thereby preventing the extension of said shield beyond a predetermined limit.

4. A safety shield for a power take-off shaft, which extends between two coupled vehicles, comprising, in combination, a permanent safety guard on each of said vehicles and an intermediate safety shield adapted to connect said guards, said intermediate shield including a pair of nested, generally semi-circular, open-ended sections adapted to extend around said power take-off shaft, the outer of said sections having a relatively wide, longitudinally extending rib which defines a channel, said rib being strengthened by a pair of longitudinally extending, stiffening members attached to said outer section which extend outwardly over said channel and which define a T shaped guide-way, the inner of said sections having a longitudinally extending, relatively narrow rib to which is attached a longitudinally extending key, said key being proportioned so as to slidably engage said T shaped guideway in said outer section, thereby allowing extension of said shield in a longitudinal direction, a pair of stop tabs attached to each of said sections which are adapted to prevent the extension of said shield beyond a predetermined limit, one of said sections having means adapted to disengageably connect that section with the safety guard on one of said vehicles and hinge means for permanently connecting the other of said sections to the safety guard on the other of said vehicles, said hinge means including horizontal and vertical hinge pins so as to permit swivel movement of said intermediate safety shield in relation to the permanent safety guards.

5. A safety shield for a power take-off shaft which extends between two coupled vehicles, comprising, in combination, a permanent safety guard on each of said vehicles and an intermediate safety shield adapted to connect said guards, said intermediate shield including a pair of nested, generally semi-circular, open-ended sections adapted to extend around said power take-off shaft, the inner of said sections having a longitudinally extending rib which defines a channel, said rib being strengthened by a pair of longitudinally extending, stiffening members which are attached to said inner section and which extend outwardly over said channel thereby defining a T shaped guideway, the outer of said sections having a longitudinally extending rib which forms a ridge on one side of said member and a channel on the other side, a longitudinally extending key attached to said ridge, said key being proportioned to engage said T shaped guideway in said inner section so as to allow extension of said shield in a longitudinal direction, a reinforcing member disposed in the channel formed in said outer member, and means adapted to connect said sections with the permanent safety guards on the coupled vehicles, the connection to at least one of said safety guards being disengageable.

6. A safety shield for a power take-off shaft which extends between two coupled vehicles, comprising, in combination, a permanent safety guide on each of said vehicles and an intermediate safety shield adapted to connect said guards, said intermediate shield including a pair of nested, generally semi-circular, open-ended sections adapted to extend around said power take-off shaft, the inner of said sections having a relatively wide longitudinally extending rib which defines a channel, said rib being strengthened by a pair of longitudinally extending, stiffening members which are attached to said inner section and which extend outwardly over said channel thereby defining a T shaped guideway, the outer of said sections having a longitudinally extending relatively narrow rib which forms a ridge on the inner side of said outer shell and a channel on the outer side, a longitudinally extending key attached to said ridge, said key being proportioned so as to slidably engage the T shaped guideway in said inner section so as to allow extension of said shield in a longitudinal direction, a reinforcing member disposed in the channel defined by said relatively narrow rib, a pair of stop tabs attached to each of said sections, which are adapted to prevent the extension of the said shield beyond a predetermined limit, one of said sections having means adapted to disengageably connect that section with the safety guard on one of said vehicles and hinge means for permanently connecting the other of said sections to the safety guard on the other of said vehicles, said hinge means including horizontal and vertical hinge pins so as to permit swivel movement of said intermediate safety shield in relation to the permanent safety guards.

7. A safety shield for a power take-off shaft which extends between two coupled vehicles, comprising in combination, a permanent safety guard on each of said vehicles and an intermediate safety shield adapted to connect said guards, said intermediate shield including a pair of nested, open-ended sections adapted to extend around the top and sides of said power take-off shaft, said sections being arranged to allow extension of said shield in a longitudinal direction and having means adapted to connect said sections with the permanent safety guards on the coupled vehicles, the connection to at least one of said safety guards being disengageable, a stop tab attached to each of said nested sections, said stop tabs being proportioned to engage one another to prevent the extension of said shield beyond a predetermined limit, and a member disposed below the power take-off shaft, said member being connected to one of said sections and extending transversely across said section to prevent upward swinging of said shield out of shielding association with said shaft in the event that said disengageable connecting means is disengaged with its associated permanent safety guard.

CHARLES W. HANSEN.

REFERENCES CITED

The following references are of record in the file of this patent:

UNITED STATES PATENTS

| Number | Name | Date |
|---|---|---|
| 1,387,553 | Miller | Aug. 16, 1921 |
| 2,410,503 | Johnson | Nov. 5, 1946 |
| 2,443,035 | Hardy | June 8, 1948 |